United States Patent
Huang et al.

(10) Patent No.: US 9,543,784 B2
(45) Date of Patent: Jan. 10, 2017

(54) ELECTRIC POWER SUPPLY SYSTEM COOPERATED BY A BATTERY AND A SUPER CAPACITOR

(71) Applicant: NATIONAL CHENG KUNG UNIVERSITY, Tainan (TW)

(72) Inventors: Shyh-Jier Huang, Tainan (TW); Mi-Ching Tsai, Tainan (TW); Ying-Rong Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 197 days.

(21) Appl. No.: 14/607,502

(22) Filed: Jan. 28, 2015

(65) Prior Publication Data

US 2016/0118902 A1 Apr. 28, 2016

(30) Foreign Application Priority Data

Oct. 28, 2014 (TW) .............................. 103137231 A

(51) Int. Cl.
*H02J 7/00* (2006.01)
*H02J 7/34* (2006.01)
*H02M 3/335* (2006.01)

(52) U.S. Cl.
CPC ............ *H02J 7/34* (2013.01); *H02M 3/33584* (2013.01)

(58) Field of Classification Search
CPC ...................................................... H02J 7/345
USPC ....................................................... 320/167
See application file for complete search history.

(56) References Cited

U.S. PATENT DOCUMENTS

2009/0206657 A1\* 8/2009 Vuk .................. H01M 10/4264
307/9.1
2012/0139487 A1\* 6/2012 Kim ...................... B60R 16/033
320/109

\* cited by examiner

*Primary Examiner* — Edward Tso
*Assistant Examiner* — Ahmed Omar
(74) *Attorney, Agent, or Firm* — CKC & Partners Co., Ltd.

(57) ABSTRACT

An electric power supply system cooperated by a battery and a super capacitor includes a power source module and a processing unit. The power source module includes an electric power transformer, a battery, and a super capacitor. The electric power transformer is electrically connected to the battery and the super capacitor. The processing unit is electrically connected to the electric power transformer for controlling the battery to charge the super capacitor, such that both the battery and the super capacitor supply electricity to the load, and such that electricity generated by the load can recharge the super capacitor. The electricity power supply system can avoid an increase of the working temperature of the battery.

7 Claims, 13 Drawing Sheets

ELECTRIC POWER SUPPLY SYSTEM COOPERATED BY A BATTERY AND A SUPER CAPACITOR

BACKGROUND OF THE INVENTION

1. Field of the Invention

The present invention relates to an electric power supply system cooperated by a battery and a super capacitor and, more particularly, to an electric power supply system capable of avoiding excessive charging and excessive discharging of a battery.

2. Description of the Related Art

Due to environmental awareness, power sources using electricity are utilized in multiple applications, such as electric vehicles (EV), battery electric vehicles (BEV), hybrid electric vehicles (HEV), plug-in hybrid electric vehicles (PHEV), or energy storage systems (ESS), are prosperous.

In order to achieve a better cruising endurance of the above electric vehicles, a large-capacity battery, such as a battery unit consists of a plurality of $LiFePO_4$ batteries, is generally required to serve as the core power source module of the above electric vehicles to meet the power supply demand for the actual vehicle load.

Although a $LiFePO_4$ battery has a high energy density, an excessively large current is extracted or released from the battery at the moment of acceleration or deceleration. If the electricity is only supplied by the $LiFePO_4$ battery, dramatic reaction of chemical substances in the $LiFePO_4$ battery could occur and result in an increase of the working temperature, leading to adverse effects to the performance and the service life of the battery. Although improvement has been made by scholars, such as "A Parallel Power Supply System by $LiFePO_4$ Battery and Super Capacitors" published by Yue-wei Huang in The $17^{th}$ National Conference on Vehicle Engineering, this conventional technique requires three circuits (including a voltage increasing/decreasing circuit and two voltage decreasing circuits) for transporting the electric energy, increasing the size of the circuits and the costs.

Thus, a need exists for solving the disadvantages of the conventional techniques to avoid excessive charging or discharging of the battery, increasing the battery performance and prolonging the service life of the battery for the purposes of meeting the actual demand and increasing the utility.

SUMMARY OF THE INVENTION

An objective of the present invention is to provide an electric power supply system cooperated by a battery and a super capacitor. The battery and the super capacitor provide the load with electricity, and the super capacitor receives the electrical energy released by the load to avoid excessive charging and excessive discharging of the battery.

The present invention provides an electric power supply system cooperated by a battery and a super capacitor. The electric power supply system includes a power source module and a processing unit. The power source module includes an electric power transformer, a battery, and a super capacitor. The electric power transformer includes a first positive terminal, a first negative terminal, a second positive terminal, a second negative terminal, a first control terminal, and a second control terminal. The battery is electrically connected between the first positive terminal and the first negative terminal. The battery is connected in parallel to a load. The super capacitor is electrically connected between the second positive terminal and the second negative terminal. The processing unit includes two transformation control terminals, a switch control terminal, and a plurality of signal detection terminals. The two transformation control terminals are electrically connected to the first control terminal and the second control terminal of the electric power transformer. The plurality of signal detection terminals is adapted for detecting electrical characteristics of the power source module and the load. The processing unit controls the battery to charge the super capacitor based on the electrical characteristics, such that both the battery and the super capacitor supply electricity to the load, and such that electricity generated by the load can recharge the super capacitor.

In a case that the electricity demanded by the load is smaller than an amount of electricity supplied by the battery, only the battery supplies electricity to the load.

When the battery charges the super capacitor, the processing unit detects a voltage of the battery and uses the voltage of the battery to calculate an amount of electricity of the battery, and the super capacitor is charged according to the amount of electricity of the battery.

When the electricity demanded by the load is larger than the amount of electricity supplied by the battery and the super capacitor, the battery and the super capacitor stop supplying electricity.

When the electricity generated by the load recharges the super capacitor, the processing unit estimates an amount of charged electricity of the super capacitor 13 by using the following equation:

$$\Delta Q = \Delta C \times \Delta V$$

wherein $\Delta Q$ is a remaining power difference of the super capacitor, $\Delta C$ is a capacitance difference of the super capacitor, and $\Delta V$ is a voltage difference of the super capacitor.

The electric power transformer can include a transformer and first and second transistors. The transformer includes a primary side and a secondary side. The primary side and the first transistor are connected in series between the first positive terminal and the first negative terminal. The secondary side and the second transistor are connected in series between the second positive terminal and the second negative terminal. Each of the first and second transistors includes a control terminal. The control terminals of the first and second transistors are respectively connected to the first control terminal and the second control terminal.

The battery can be connected in series between the first positive terminal and the first negative terminal by an accumulator and a changeover switch.

The present invention will become clearer in light of the following detailed description of illustrative embodiments of this invention described in connection with the drawings.

DETAILED DESCRIPTION OF THE INVENTION

As used herein, the term "couple" refers to a type of connection allowing transmission of signals between two conductors by coupling (such as electromagnetic or photoelectric coupling), which can be appreciated by a person having ordinary skill in the art.

Figure 1:
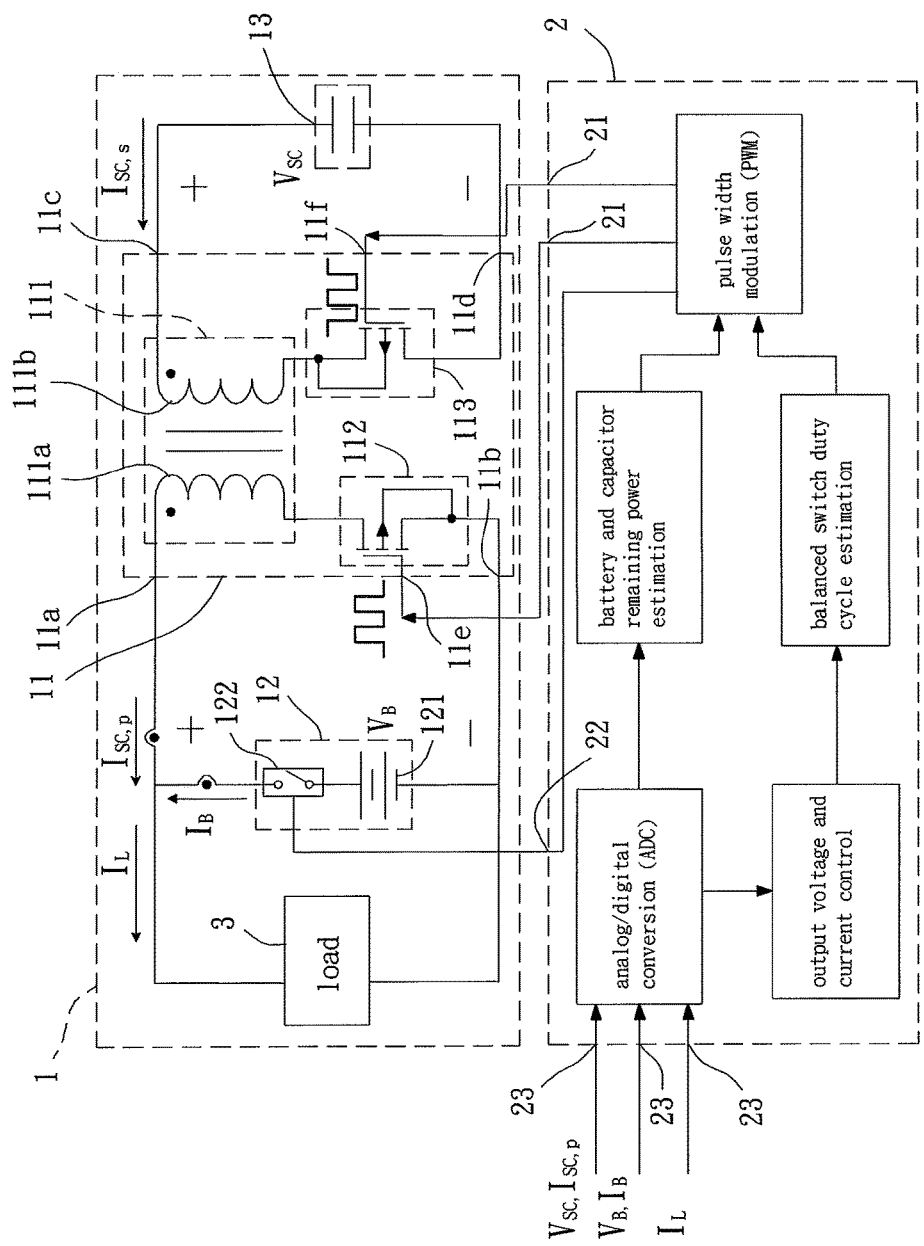
FIG. 1 is a diagrammatic circuit diagram of an embodiment of an electric power supply system cooperated by a battery and a super capacitor according to the present invention.

FIG. 1 is a diagrammatic circuit diagram of an embodiment of an electric power supply system cooperated by a battery and a super capacitor according to the present invention. The electric power supply system cooperated by a battery and a super capacitor includes a power source module 1 and a processing unit 2 electrically connected to the power source module 1.

With reference to FIG. 1, the power source module 1 includes an electric power transformer 11, a battery 12, and a super capacitor 13. The electric power transformer 11 includes a first positive terminal 11a, a first negative terminal 11b, a second positive terminal 11c, a second negative terminal 11d, a first control terminal 11e, and a second control terminal 11f. The electric power transformer 11 can be used to convert variations of electrical signals (such as voltage or current). The battery 12 is electrically connected between the first positive terminal 11a and the first negative terminal 11b. Furthermore, the battery 12 can be connected in parallel to a load 3. The super capacitor 13 is electrically connected between the second positive terminal 11c and the second negative terminal 11d of the electric power transformer 11.

In the embodiment shown in FIG. 1, the electric power transformer 11 includes a transformer 111 (such as a transformer having a turns ratio of 1:2) and two transistors 112 and 113 (such as metal-oxide-semiconductor (MOS) transistors or bipolar junction transistors (BJTs)). The transformer 111 includes a primary side 111a and a secondary side 111b. The primary side 111a and the transistor 112 are connected in series between the first positive terminal 11a and the first negative terminal 11b. The secondary side 111b and the transistor 113 are connected in series between the second positive terminal 11c and the second negative terminal 11d. The transistors 112 and 113 are electrically connected to the first control terminal 11e and the second control terminal 11f by control terminals (such as the gates of MOS transistors or the bases of BJTs) thereof. Furthermore, the battery 12 can be connected between the first positive terminal 11a and the first negative terminal 11b of the electric power transformer 11 by an accumulator 121 and a changeover switch 122. The accumulator 121 can be a LiFePO$_4$ battery. The specifications of the accumulator 121 can include: rated voltage 48V, end-of-charge voltage 54.7V, end-of-discharge voltage 30V, and capacity 1.05 amperehour (Ah). The changeover switch 122 can be a conventional electric switch (such as a transistor or a thyristor) for switching the connection between the accumulator 121, the electric power transformer 11 and the load 3. The specifications of the super capacitor 13 can include: capacitance 7.14 F, rated voltage 36V, etc. The load 3 can be a motor of an electric vehicle. When the electric vehicle accelerates, the power source module 1 supplies electricity to the motor. When the electric vehicle decelerates, the motor can generate electricity for recharging the power source module 1. However, the present invention is not limited to this. The load 3 can have a power switcher for cutting or creating the connection between the load 3 and the power source module 1, which can be appreciated by a person having ordinary skill in the art.

Still referring to FIG. 1, the processing unit 2 can be an electronic device capable of handling signals. The processing unit 2 includes two transformation control terminals 21, a switch control terminal 22, and a plurality of signal detection terminals 23. The two transformation control terminals 21 are electrically connected to the first control terminal 11e and the second control terminal 11f of the electric power transformer 11 for adjusting the switch duty cycle for controlling the voltages of the first control terminal 11e and the second control terminal 11f. The switch control terminal 22 is electrically connected to the battery 12 of the power source module 1 for switching the connection between the battery 12 and the load 3. The signal detection terminals 23 can be coupled to the power source module 1 and the load 3 to permit the power source module 1 and the load 3 to feed back electrical signals to the processing unit 2.

In the embodiment shown in FIG. 1, the switching control terminal 22 is electrically connected to the changeover switch 122 of the battery 12 of the power source module 1. The output signal of the switch control terminal 22 can be a DC current with a high level or a low level. The processing unit 2 can include an analog/digital conversion (ADC) module, an output voltage and current control module, a battery and capacitor remaining power estimation module, a balanced switch duty cycle estimation module, and a pulse width modulation (PWM) module according to the functions for executing control software or hardware. However, the present invention is not limited to this. The output signals of the two transformation control terminals 21 can be pulse width modulation (PWM) signals. The duty cycles, frequencies and amplitudes of the output signals can be the same or different from each other. Furthermore, the processing unit 2 can be comprised of a processor (such as a single-chip integrated circuit), a current detector (such as a Hall element or a current detecting integrated circuit), and a voltage detector (such as a resistance type potential divider, a transistor, or a voltage detecting integrated circuit), such that the processing unit 2 can obtain the current $I_L$ of the load 3 and the electrical signals fed back from the power source module 1, such as the voltage $V_B$ and the current $I_B$ of the battery 12 and the voltage $V_{SC}$ and the current $I_{SC}$ of the super capacitor 13. A non-restrictive example will be used to explain the feedback control.

Figure 2:
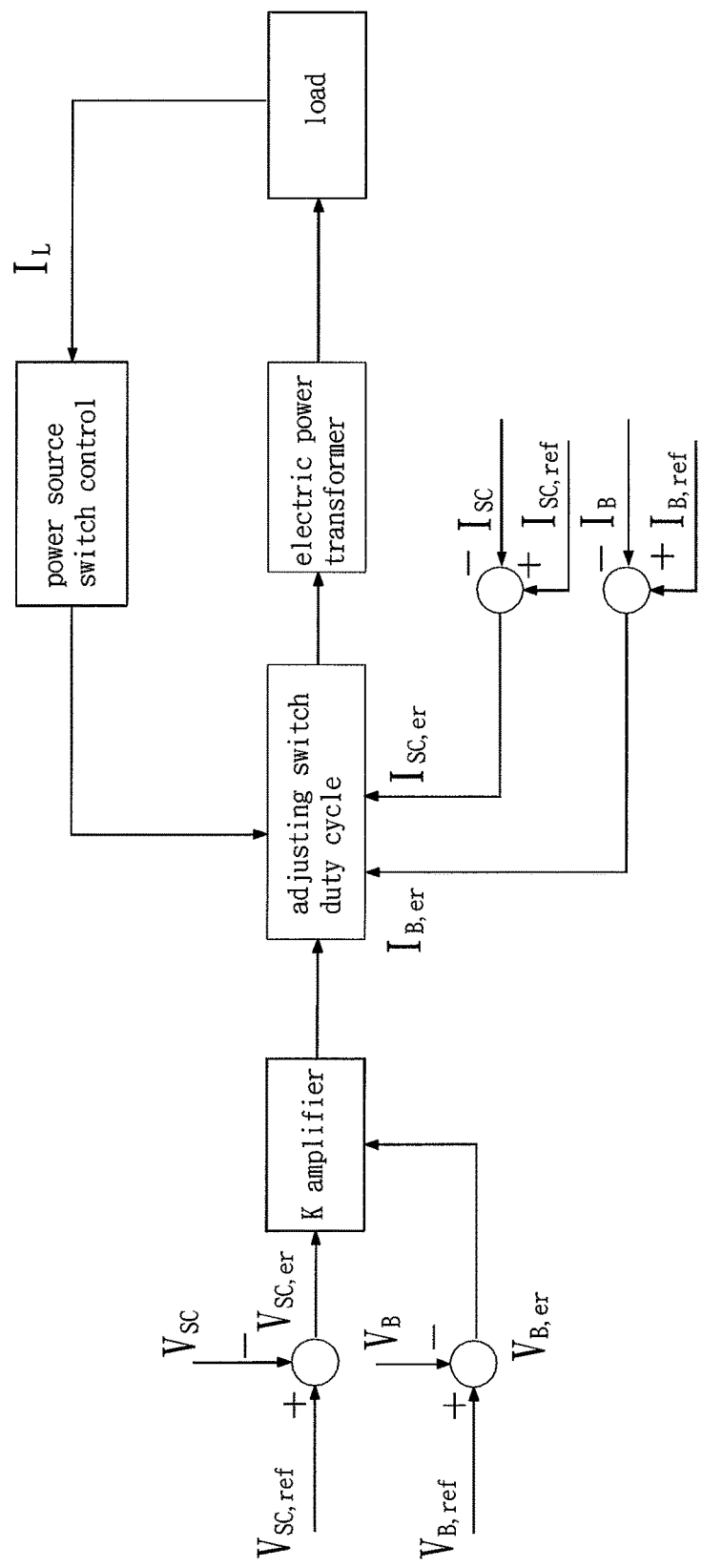
FIG. 2 shows a feedback control flowchart of the embodiment of an electric power supply system cooperated by a battery and a super capacitor.

FIG. 2 shows a feedback control flowchart of the embodiment of an electric power supply system cooperated by a battery and a super capacitor. The processing unit 2 can store a plurality of reference voltages $V_{SC,ref}$ and $V_{B,ref}$ and a plurality of reference currents $I_{SC,ref}$ and $I_{B,ref}$. After obtaining the above voltages $V_{SC}$ and $V_B$ and the above currents $I_B$, $I_{SC}$, and $I_L$, the current difference $I_{SC,er}$ between $I_{SC,ref}$ and $I_{SC}$, the current difference $I_{B,er}$ between $I_{B,ref}$ and $I_B$, the voltage difference $V_{SC,er}$ between $V_{SC,ref}$ and $V_{SC}$, and the voltage difference $V_{B,er}$ between $V_{B,ref}$ and $V_B$ can be calculated. The voltage differences $V_{SC,er}$ and $V_{B,er}$ can be properly amplified (such as amplified K times by a K amplifier) and can be based to adjust the switch duty cycles for controlling the voltages of the first control terminal 11e and the second control terminal 11f according to $I_{SC,er}$ and $I_{B,er}$ and $I_L$ after power switch control.

An example of adjustment of the switch duty cycle will now be set forth. For example, the electrical signals of the above voltages and the above currents are inputted into the processing unit 2. If the processing unit 2 identifies that voltage $V_B$ is insufficient (such as smaller than a preset value), the switch duty cycle is increased to increase the conduction time to thereby increase the voltage outputted to the first control terminal 11e and the second control terminal 11f. On the other hand, if voltage $V_B$ is too high, the switch duty cycle is reduced to reduce the conduction time to thereby reduce the voltage outputted to the first control terminal 11e and the second control terminal 11f. The relation between the input voltage and the output voltage during adjustment of the switch duty cycle is fulfilled by the following equation:

$$\frac{Vo}{Vin} = \frac{N1}{N2} \times \frac{D1}{1-D1}$$

wherein Vin is the input voltage during adjustment of the switch duty cycle, Vo is the output voltage during adjustment of the switch duty cycle, N1/N2 is the turns ratio of the transformer 111, and D1 is the switch duty cycle at the super capacitor side 13. In a similar way, another switch duty cycle D2 can be obtained.

Thus, two pulse width modulation signals for balancing the switch duty cycles D1 and D2 can be generated and can be used as a reference for deciding whether controlling power supply to the load 3 by the electric power transformer 11 is required. For example, when the motor accelerates, the incoming current $I_L$ can be supplied from the power source module 1. When the motor decelerates, the outgoing current $I_L$ recharges the power source module 1. Examples of the operations are described hereinafter.

Figure 3:
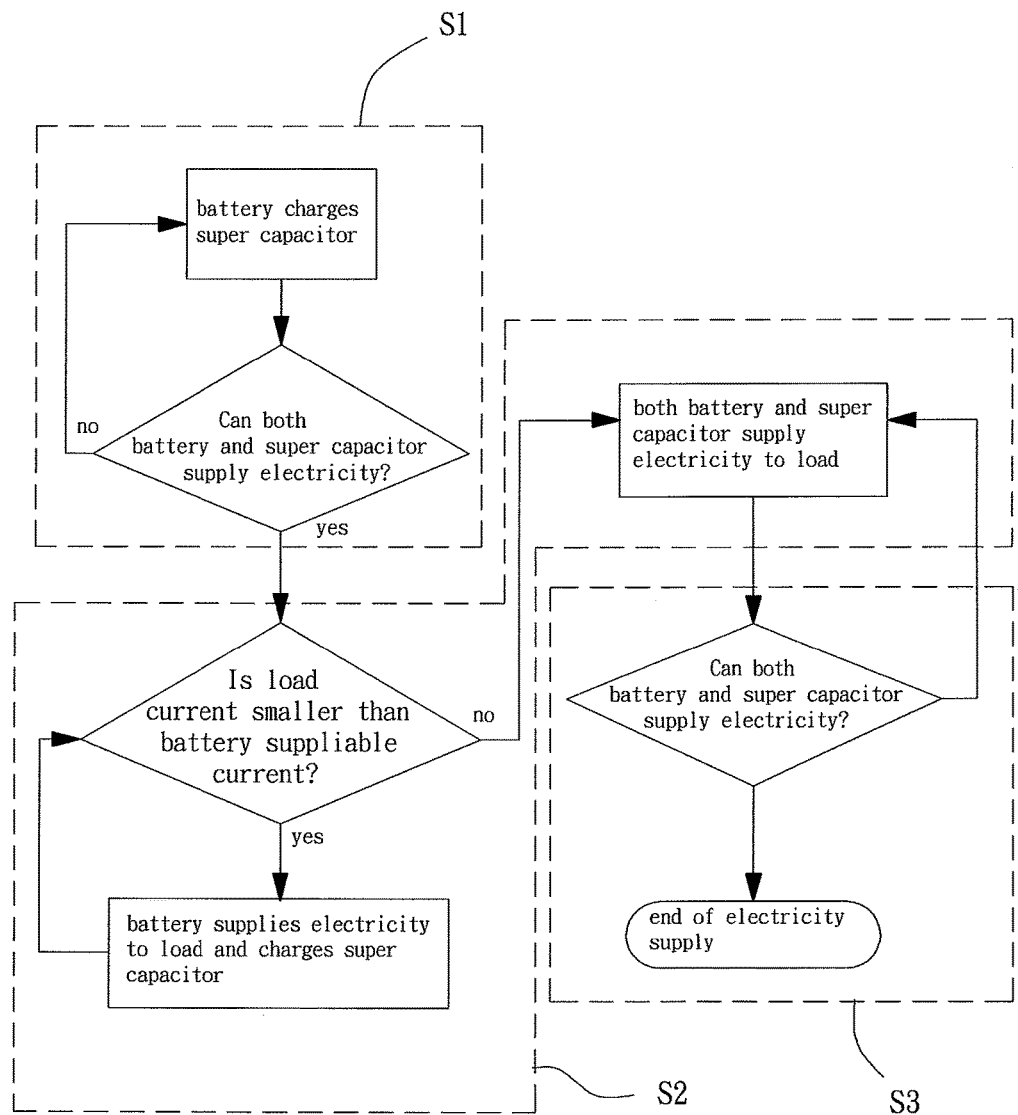
FIG. 3 shows a control flowchart of electricity supply to a load by a power source module of the embodiment of an electric power supply system cooperated by a battery and a super capacitor.

FIG. 3 shows a control flowchart of electricity supply to the load 3 by the power source module 1 of the embodiment of an electric power supply system cooperated by a battery and a super capacitor. With reference to FIG. 1, in the power supply control process, the switch control terminal 22 of the processing unit 2 makes the changeover switch 122 of the battery 12 becomes conductive (ON), such that the battery 12 can output electricity, and an electricity preparation procedure S1, a power supply procedure S2, and a monitoring procedure S3 are carried out. In the electricity preparation procedure S1 the processing unit 2 identifies that the power source module 1 can supply electricity. In the power supply procedure S2 the power source module 1 supplies electricity to the load 3. The amount of electricity consumed by the load 3 is identified in the monitoring procedure S3.

Figure 4A:
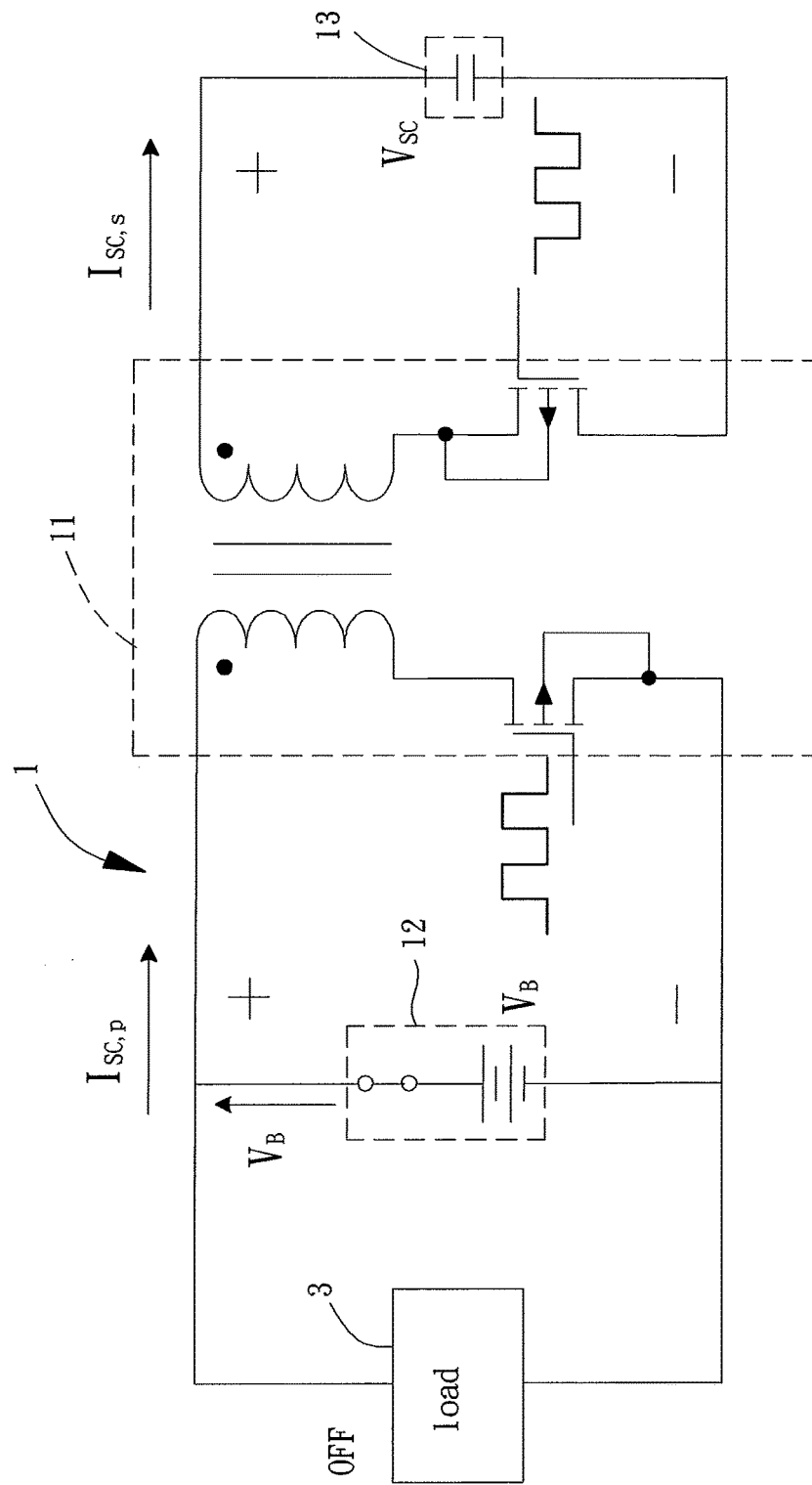
FIG. 4a is a diagrammatic circuitry illustrating charging a super capacitor by a battery of the embodiment of an electric power supply system cooperated by a battery and a super capacitor according to the present invention.

Still referring to FIGS. 1 and 3, in the electricity preparation procedure S1 the battery 12 charges the super capacitor 13 until both the battery 12 and the super capacitor 13 can supply electricity. In this embodiment, the processing unit 2 firstly checks whether the voltage $V_B$ of the battery 12 is larger than a safety threshold voltage $V_{B,max}$. If yes, the battery 12 is not suitable for supplying electricity (namely, the battery 12 is in a "not available for electricity supply" status). If not, the battery 12 is suitable for supplying electricity (namely, the battery 12 is in an "available for electricity supply" status). Next, the processing unit 2 identifies whether the voltage $V_{SC}$ of the super capacitor 13 is smaller than a preset voltage $V_{SC,min}$. If yes, the super capacitor 13 still cannot supply electricity. In this case, as shown in FIG. 4a, the processing unit 2 generates two pulse width modulation signals to the first control terminal 11e and the second control terminal 11f, such that the battery 12 charges the super capacitor 13 (which will be set forth hereinafter). If not, both the super capacitor 13 and the battery 12 can supply electricity. In this case, the load 3 can be turned on (e.g., the motor starts to run) to proceed with the power supply procedure S2.

Figure 5:
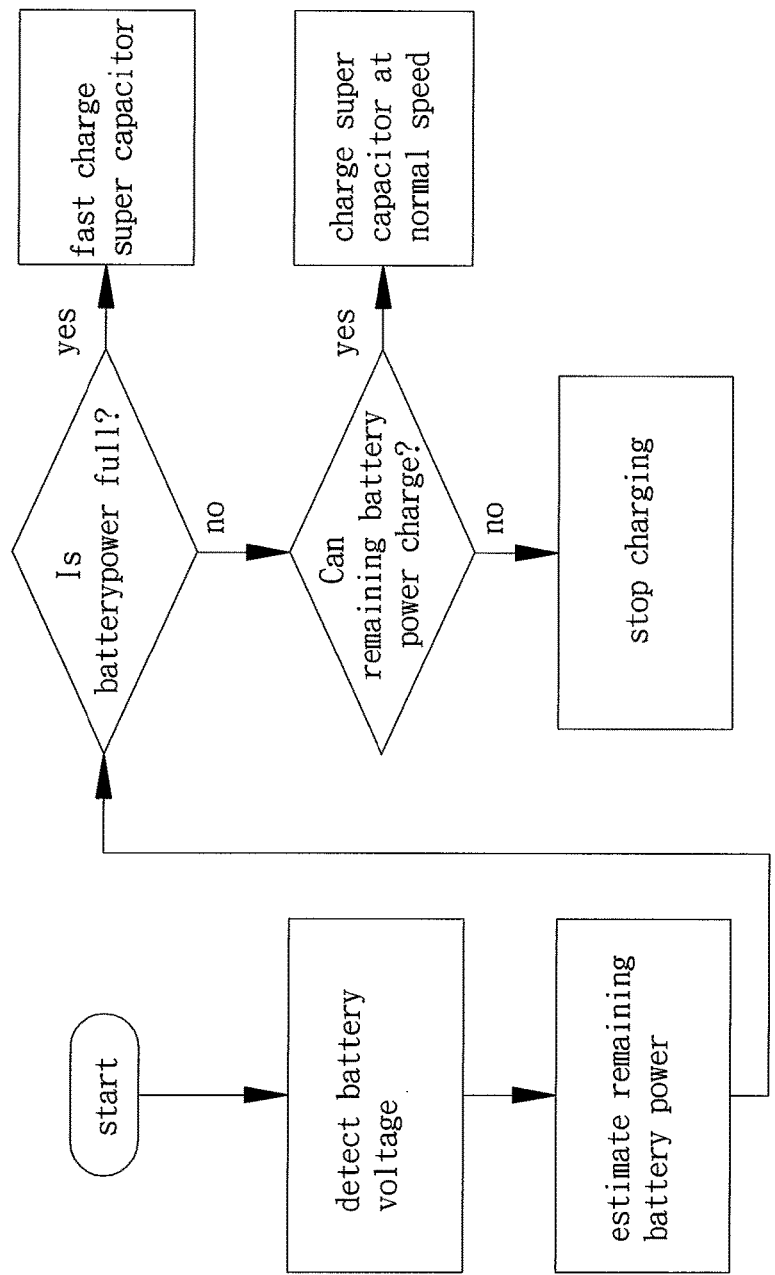
FIG. 5 is a flowchart of charging the super capacitor by the battery of the embodiment of an electric power supply system cooperated by a battery and a super capacitor according to the present invention.

FIG. 5 is a flowchart of charging the super capacitor 13 by the battery 12 of the embodiment of an electric power supply system cooperated by a battery and a super capacitor according to the present invention. The processing unit 2 can detect the voltage of the battery 12 to calculate the remaining power of the battery 12. The calculating equation can be $Q=C \times V$ (wherein Q is the remaining power of electricity, C is the capacitance, and V is the voltage). Then, the amount of electricity can be used to identify whether the battery 12 is in a saturated status (e.g., $Q \geq Q_{total} \times 90\%$). If yes, the processing unit 2 can control the battery 12 to proceed with fast charging of the super capacitor 13. For example, assuming the super capacitor has a rated charging current (C), the charging current during fast charging is two times the rated charging current (2 C). If not, the remaining power of the battery 12 is identified to be whether in the "available for electricity supply" status (e.g., $Q=Q_{total} \times 20 \sim 90\%$). If yes, the processing unit 2 controls the battery 12 to proceed with normal charging of the super capacitor 13. For example, the charging current during normal charging is one time the rated charging current (1 C). However, the present invention is not limited to these examples.

Figure 4B:
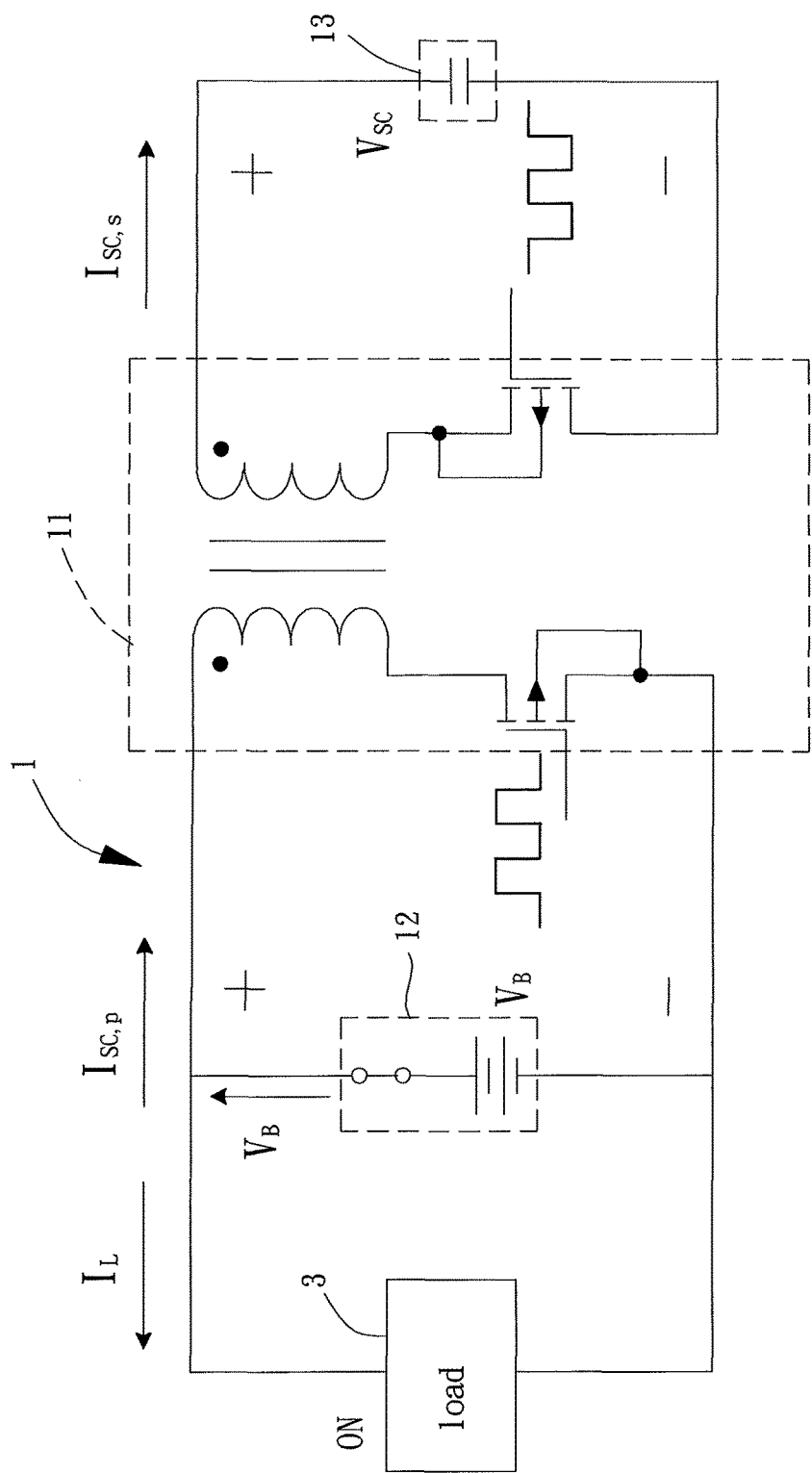
FIG. 4b is a diagrammatic circuitry illustrating electricity supply to the load only by the battery of the embodiment of an electric power supply system cooperated by a battery and a super capacitor according to the present invention.
Figure 4C:
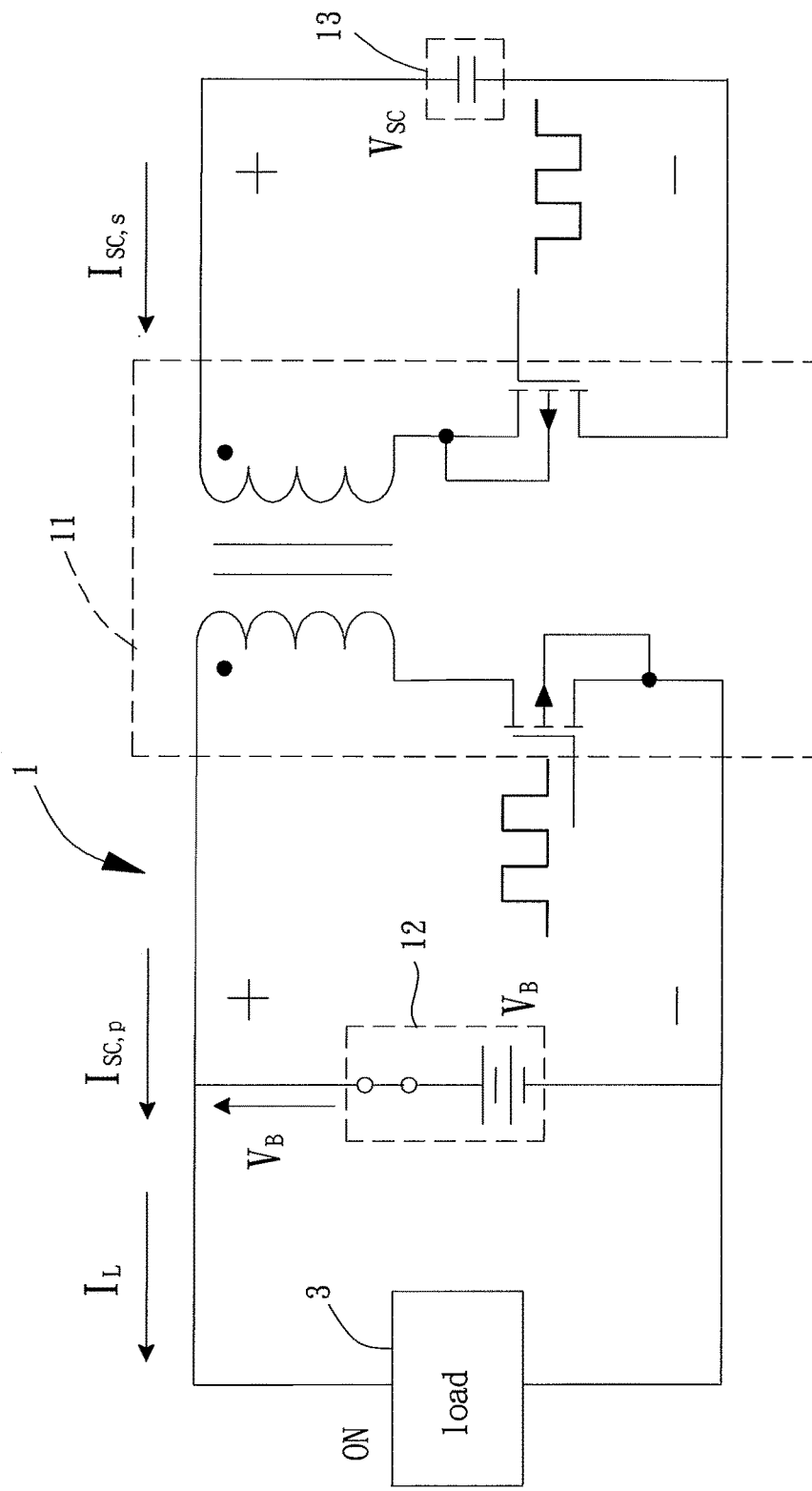
FIG. 4c is a diagrammatic circuitry illustrating electricity supply to the load by both the battery and the super capacitor of the embodiment of an electric power supply system cooperated by a battery and a super capacitor according to the present invention.

Still referring to FIGS. 1 and 3, in the power supply procedure S2 the current demanded by the load 3 is used to identify the power supply mode ("supply by battery only" or "supply by both of battery and super capacitor"). In this embodiment, the processing unit 2 identifies the power supply mode according to the current $I_L$ demanded by the load 3. If the current $I_L$ is smaller than the suppliable current (the safety threshold voltage $V_{B,max}$) of the battery 12, the current $I_B$ of the battery 12 alone is sufficient to provide the electricity demanded by the load 3, and the excessive electrical energy can charge the super capacitor 13, as shown in FIG. 4b. On the other hand, as shown in FIG. 4c, if the current $I_L$ is larger than the safety threshold voltage $V_{B,max}$ of the battery 12, the battery 12 is insufficient to provide the electricity demanded by the load 3, such that both the battery 12 and the super capacitor 13 supply electricity to the load 3. Then, the monitoring procedure S3 can be carried out.

Still referring to FIGS. 1 and 3, the monitoring procedure S3 identifies whether power supply should be terminated. In this embodiment, the processing unit 2 identifies whether the current $I_L$ demanded by the load 3 is larger than the power supply upper limit of the power source module 1 to avoid damage to the power source module 1. If the current $I_L$ is larger than the sum of the current $I_B$ of the battery 12 and the current $I_{SC}$ of the super capacitor 13, the load 3 must be turned off (such as stop the motor) to avoid dramatic reaction of the chemical substances in the battery 12 that would lead to an increase of the working temperature of the battery 12. On the other hand, if the current $I_L$ is smaller than or equal to the sum of the current $I_B$ of the battery 12 and the current $I_{SC}$ of the super capacitor 13, both the battery 12 and the super capacitor 13 supply electricity to the load 3.

Figure 4D:
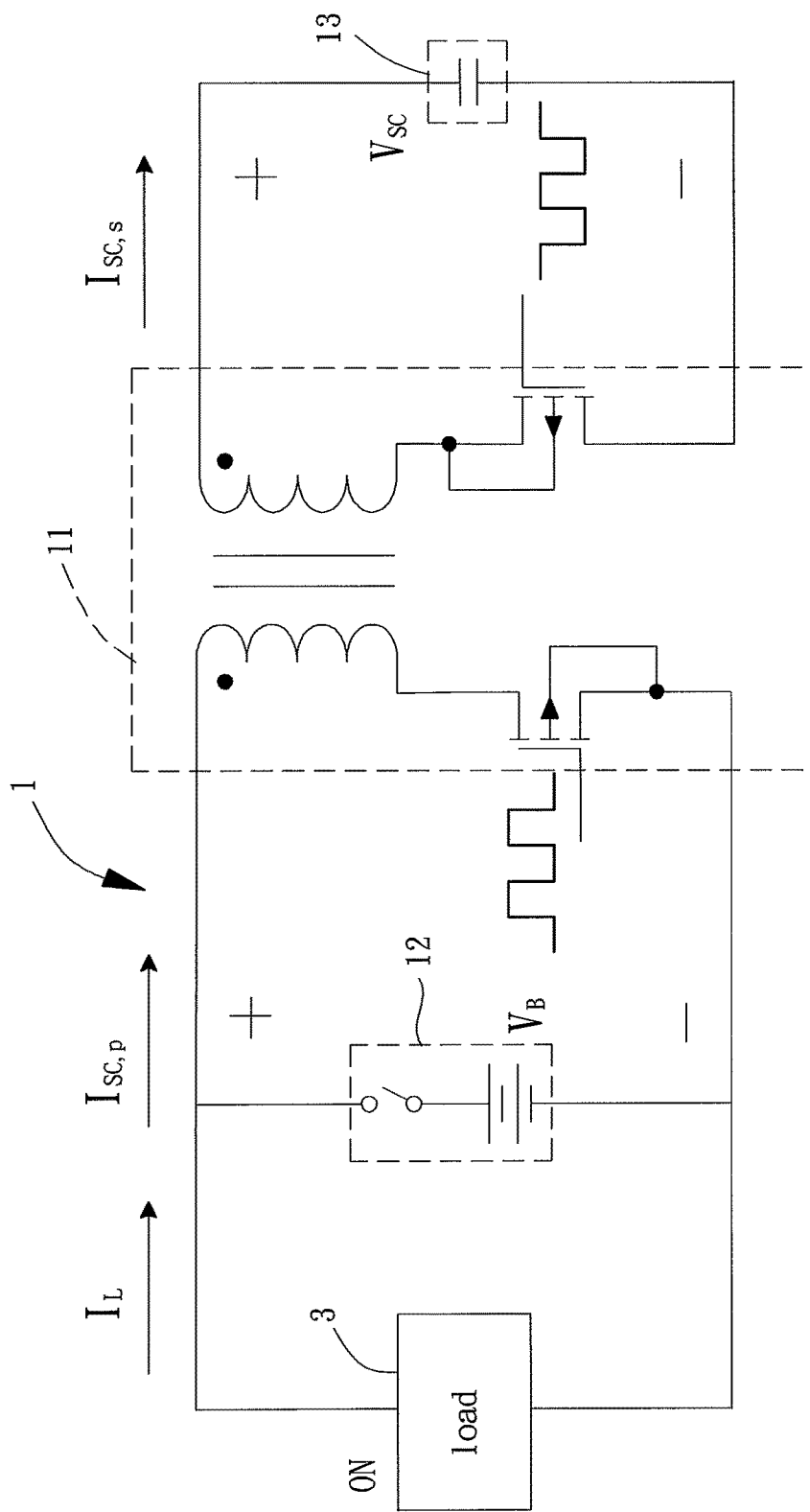
FIG. 4d is a diagrammatic circuitry illustrating recharging from the load to the super capacitor of the embodiment of an electric power supply system cooperated by a battery and a super capacitor according to the present invention.
Figure 6:
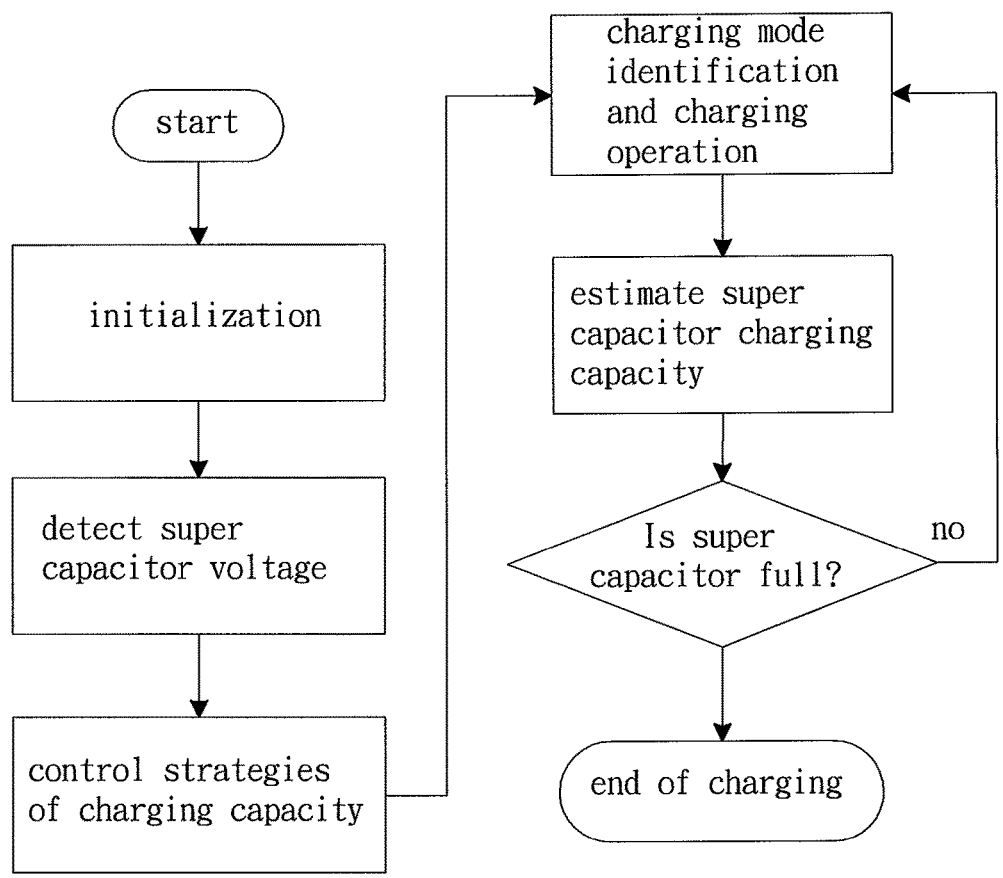
FIG. 6 is a control flowchart of recharging by the load of the embodiment of an electric power supply system cooperated by a battery and a super capacitor according to the present invention.

FIG. 6 is a control flowchart of recharging by the load 3 of the embodiment of an electric power supply system cooperated by a battery and a super capacitor according to the present invention. The charging control procedure can be carried out when the load 3 can output current $I_L$ to the power source module 1. The switch control terminal 22 of the processing unit 2 turns off the changeover switch 122 of the battery 12 (as shown in FIG. 4d), such that the load 3 only charges the super capacitor 13. The processing unit 2 can proceed with an initialization operation on the modules thereof (such as the ADC module and the PWM module) to detect the voltage $V_{SC}$ of the super capacitor 13 for the purposes of charging the super capacitor 13, such as control strategies of charging current, identification of the charging mode, and the charging operation. The identification of the charging mode is that when the voltage $V_{SC}$ is lower than the $V_{SC,min}$, if the load 3 has not been engaged (not connected), the battery 12 is used to charge the super capacitor 13 first. The charging current depends on the remaining power of the battery 12. When the amount of electricity of the battery 12 is in the full area, the fast charging mode is entered, and the output charging current is 1 A. When the remaining power of the battery 12 drops to the electricity supply available area, it is switched to the normal charging mode, and the charging current flowing into the super capacitor 13 end is 0.5 A. If the load 3 has been engaged, the excessive current of the battery 12 or the load charging energy can be used to proceed with charging. The charging procedure ends when the super capacitor 13 has been fully charged. Then, the amount of charged electricity of the super capacitor 13 can be estimated.

Figure 7:
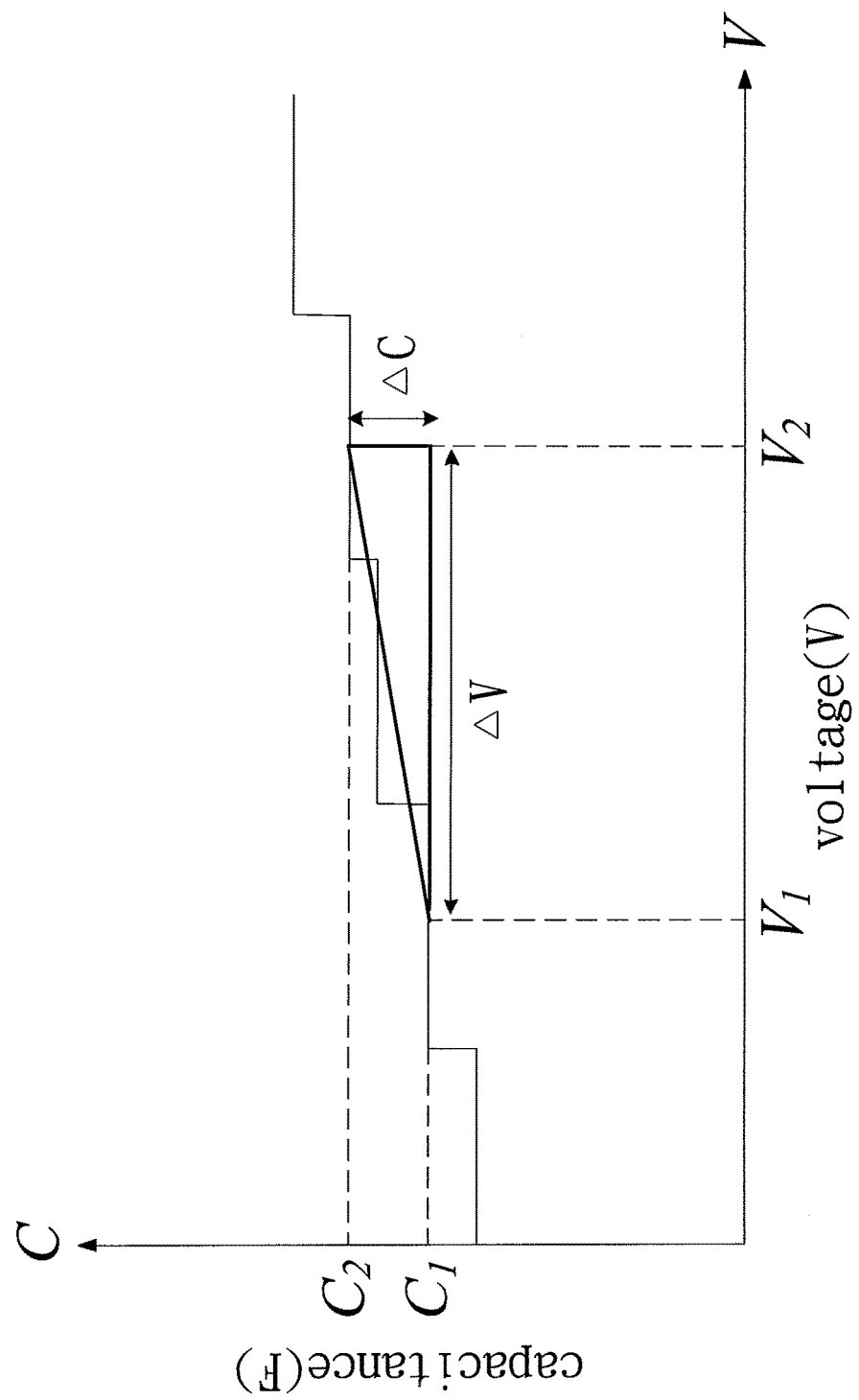
FIG. 7 is a capacitance-voltage diagram of the super capacitor of the embodiment of an electric power supply system cooperated by a battery and a super capacitor according to the present invention.

FIG. 7 is a capacitance-voltage diagram of the super capacitor 13 of the embodiment of an electric power supply system cooperated by a battery and a super capacitor according to the present invention. The relation between the capacitance F of the super capacitor 13 and the voltage V of the super capacitor 13 is a step function. Thus, the amount of charged electricity of the super capacitor 13 can be estimated by the following equation:

$$\Delta Q = \Delta C \times \Delta V$$

wherein $\Delta Q$ is the remaining power difference, $\Delta C$ is the capacitance difference, and $\Delta V$ is the voltage difference. Furthermore, whether the super capacitor 13 has been fully charged can be identified. If yes, the charging procedure ends, such as turning off the load 3. If not, the charging procedure continues. Thus, during the charging procedure, the capacitance difference and the voltage difference of the super capacitor 13 can be used to estimate the remaining power difference, avoiding the disadvantage of "the operating current still affects the capacitance value of the super capacitor 13 even though the voltage $V_{SC}$ has reached its maximum $V_{SC,max}$, such that after charging, the decreasing rates of the self-discharging voltage vary due to the different charging currents, leading to an inefficient electrical energy storage effect." The processing unit 2 can directly and rapidly control the power source module 1 to avoid damage to the circuit resulting from calculation delay while avoiding an increase of the working temperature of the battery 12.

Figure 8A:
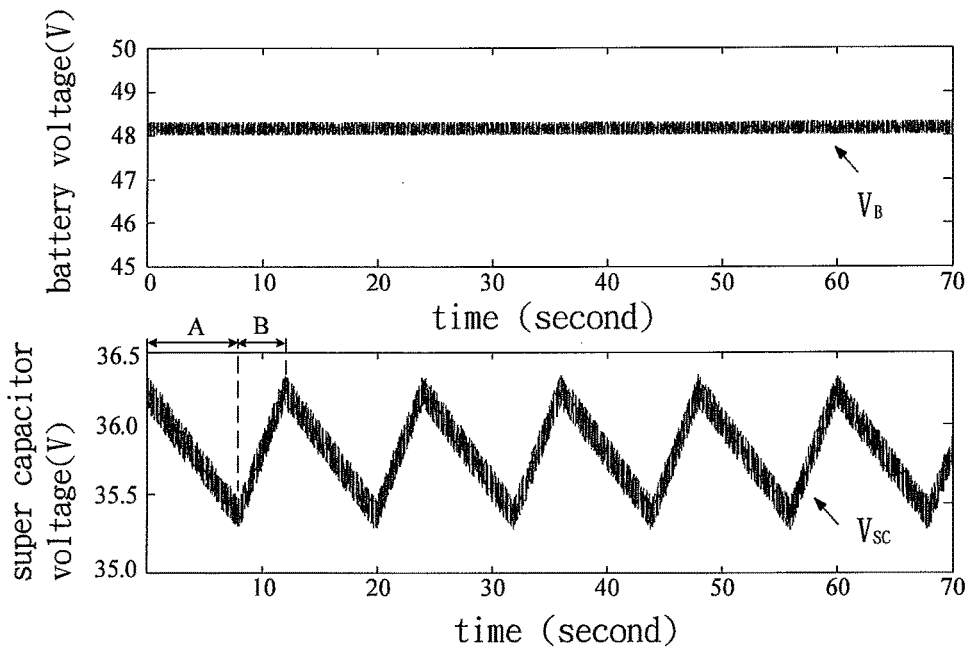
FIG. 8a shows voltage waveforms of the embodiment of an electric power supply system cooperated by a battery and a super capacitor according to the present invention under a light load.
Figure 8B:
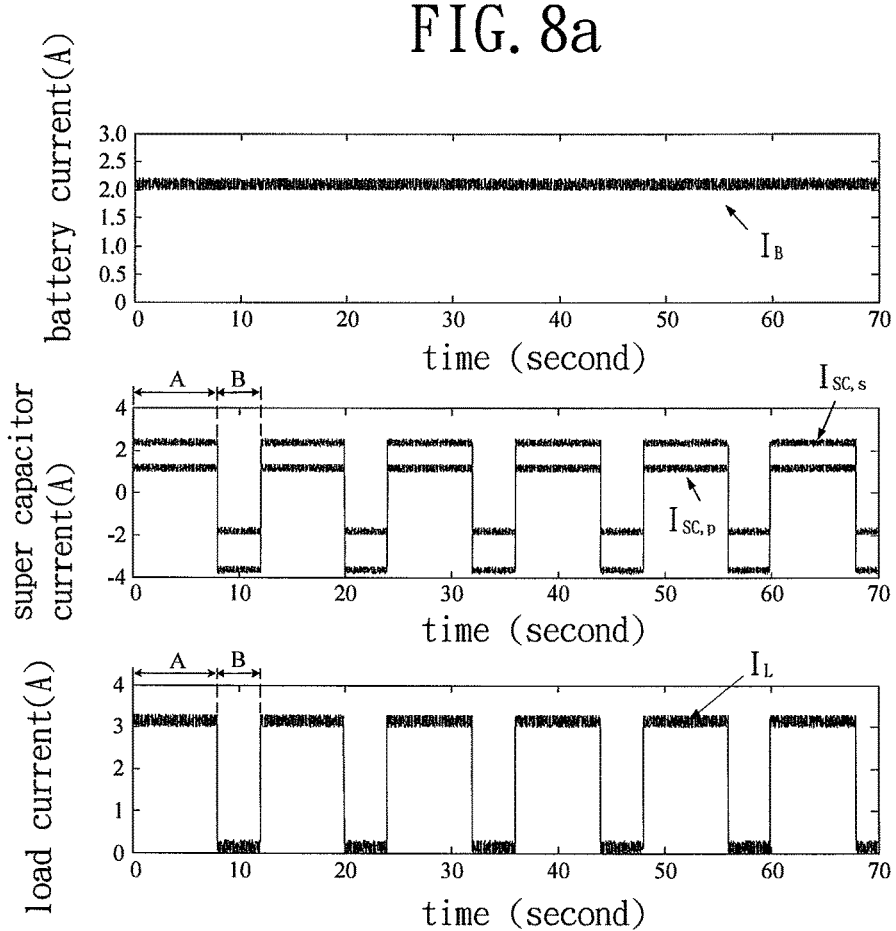
FIG. 8b shows current waveforms of the embodiment of an electric power supply system cooperated by a battery and a super capacitor according to the present invention under a light load.
Figure 9A:
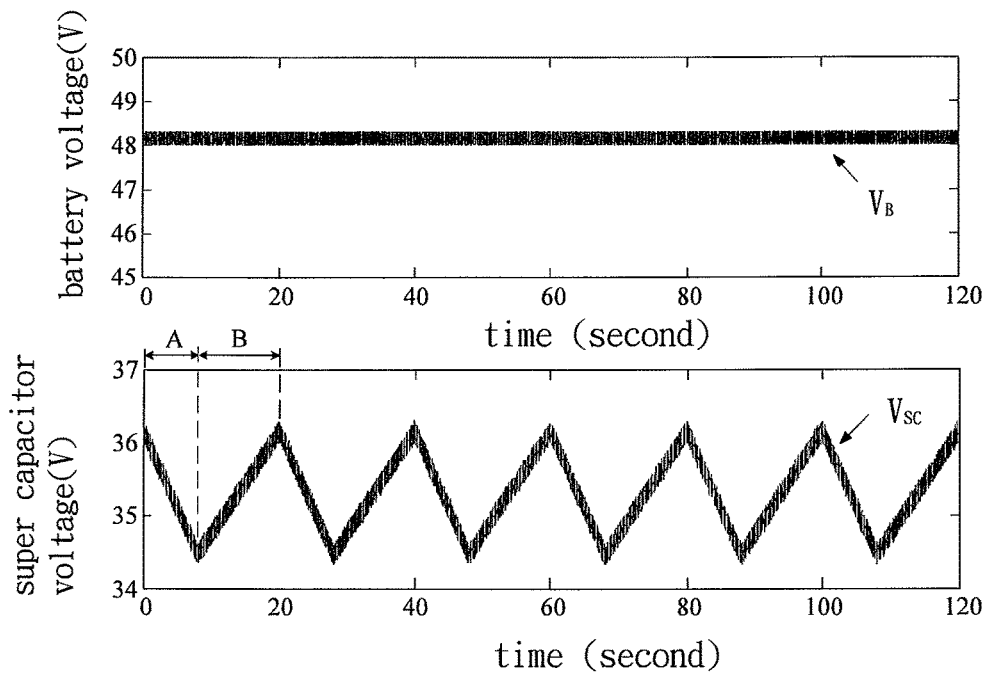
FIG. 9a shows voltage waveforms of the embodiment of an electric power supply system cooperated by a battery and a super capacitor according to the present invention under a middle load.
Figure 9B:
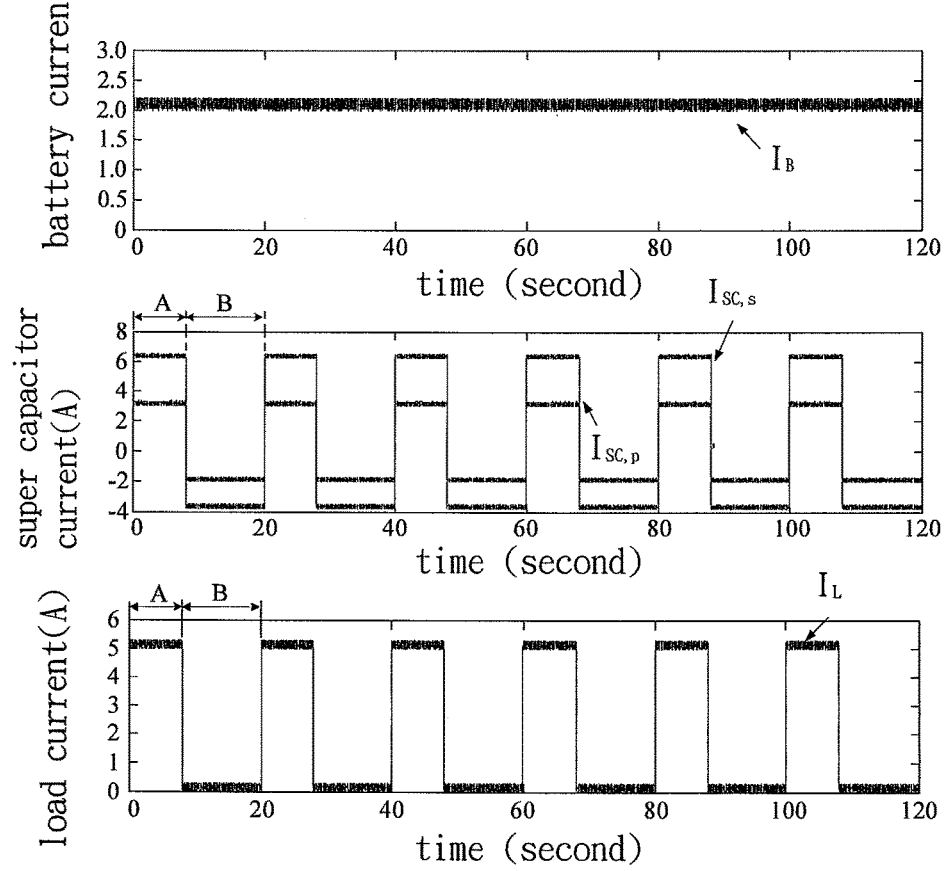
FIG. 9b shows current waveforms of the embodiment of an electric power supply system cooperated by a battery and a super capacitor according to the present invention under a middle load.
Figure 10A:
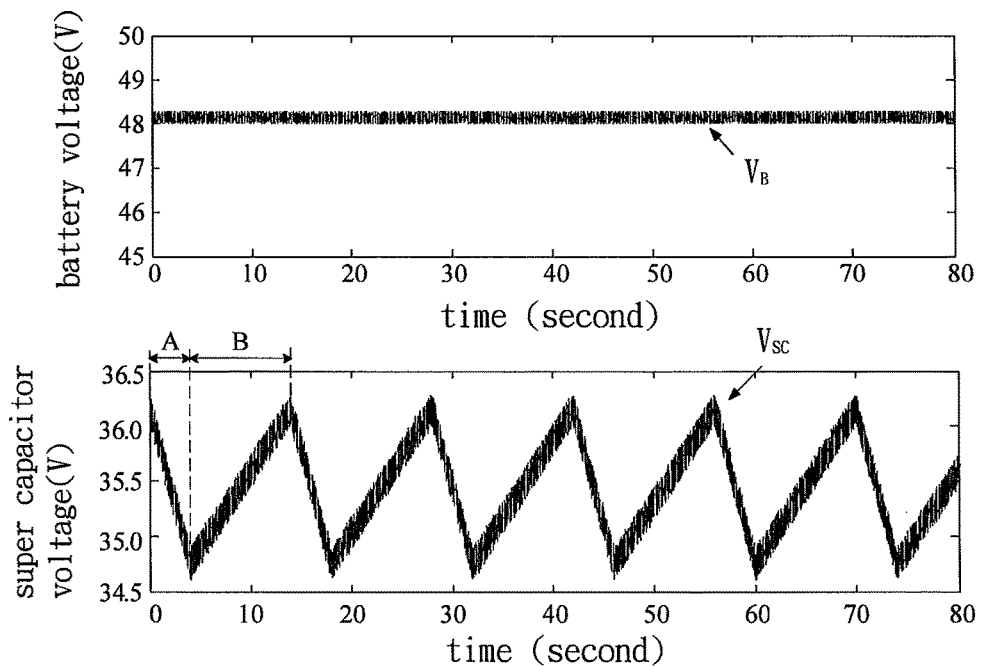
FIG. 10a shows voltage waveforms of the embodiment of an electric power supply system cooperated by a battery and a super capacitor according to the present invention under a heavy load.
Figure 10B:
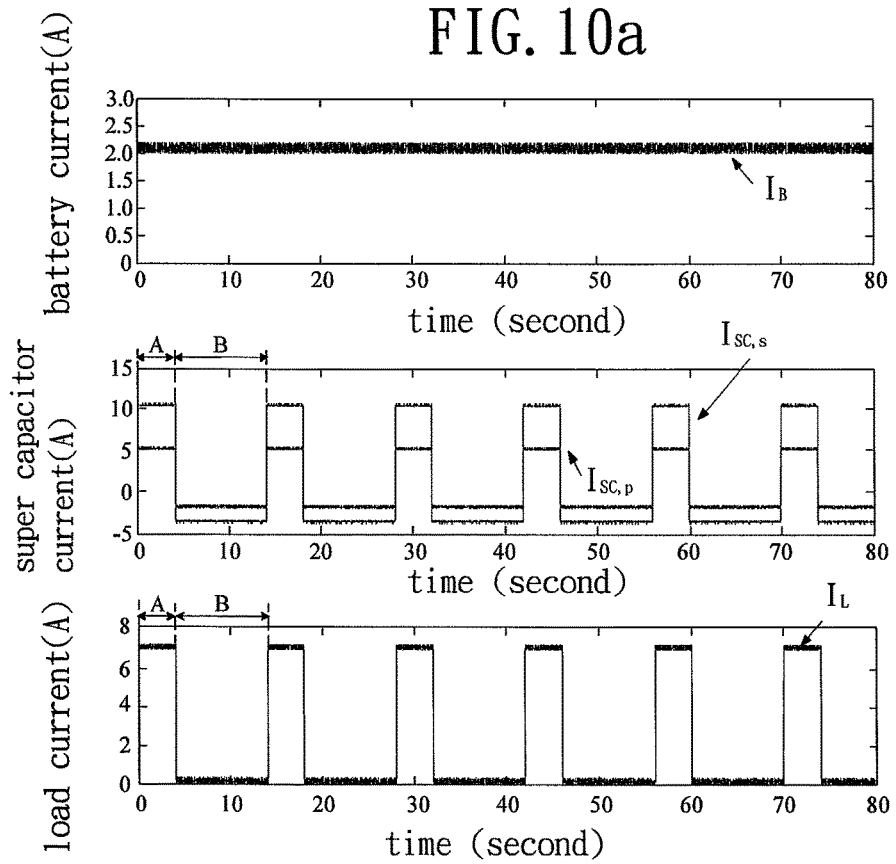
FIG. 10b shows current waveforms of the embodiment of an electric power supply system cooperated by a battery and a super capacitor according to the present invention under a heavy load.

FIGS. 8a, 8b, 9a, 9b, 10a, and 10b show voltage waveforms and current waveforms of the embodiment of an electric power supply system cooperated by a battery and a super capacitor according to the present invention under a light load, a middle load, and a heavy load, respectively. With reference to FIGS. 4a, 4c, 8a, 9a, and 10a, no matter the load is light, middle, or heavy, the voltage $V_B$ of the battery 12 is fixed, and the voltage $V_{SC}$ of the super capacitor 13 includes two alternating stages A and B (the super capacitor 13 discharges the load 3 during stage A, and the battery 12 charges the super capacitor 13 during stage B). As shown in FIGS. 8b, 9b, and 10b, no matter the load is light, middle, or heavy, the current $I_B$ of the battery 12 is fixed, and the current $I_L$ of the load 3 during stage A approximates the sum of the current $I_B$ of the battery 12 and the current $I_{SC,p}$ of the super capacitor 13. Thus, in actual operation of the electric power supply system cooperated by a battery and a super capacitor according to the present invention can reliably supply electricity to the load 3 while avoiding excessive charging and excessive discharging of the battery 12 to thereby prevent an increase in the working temperature of the battery 12. Thus, the battery performance can be improved and the service life of the battery can be prolonged.

By the above technical solution, the main features of the electric power supply system cooperated by a battery and a super capacitor are that the battery 12 of the power source module 1 of the electric power supply system is electrically connected between the first positive terminal 11a and the first negative terminal 11b of the electric power transformer 11. The battery 12 is connected in parallel to a load 3. Furthermore, the super capacitor 13 is electrically connected between the second positive terminal 11c and the second negative terminal 11d of the electric power transformer 11. Furthermore, the two transformation control terminals 21 are electrically connected to the first control terminal 11e and the second control terminal 11f of the electric power transformer 11. Furthermore, the switch control terminal 22 is electrically connected to the battery 12. The plurality of signal detection terminals 23 is coupled to the power source module 1 and the load 3.

Thus, the processing unit 2 can control the battery 12 to charge the super capacitor 13 and can control the discharging power of the super capacitor 13. Furthermore, both the battery 12 and the super capacitor 13 can supply electricity to the load 3 at the same time according to the electricity demand of the load 3. Alternatively, the battery 12 can solely be used to provide electricity to the load 3 to avoid the load 3 from extracting an excessively large current from the battery 12 or discharging an excessively large current to the battery 12, achieving the effect of improving the battery performance and prolonging the service life of the battery 12.

Furthermore, the circuit efficiency of the conventional technique using three circuits for transporting the electricity is merely 85%, whereas the circuit efficiency of the power source module 1 according to the present invention is 95%, which is higher than the conventional technique, achieving the effect of reducing the volume and costs of the circuit.

Furthermore, in the process example of controlling recharging of the load 3 according to the present invention, during the charging procedure, the processing unit 2 can directly and rapidly control the power source module 1 and can utilize the step function of the capacitance and the voltage of the super capacitor 13 and utilize the capacitance difference and the voltage difference of the super capacitor 13 to estimate the remaining power difference. The state of the amount of electricity of the super capacitor 13 can be precisely handled to avoid the disadvantage of different charging currents resulting in different decreasing rates of the self-discharging voltage and leading to an inefficient electrical energy storage effect, to avoid damage to the circuit resulting from calculation delay, and to avoid an increase of the working temperature of the battery 12.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An electric power supply system cooperated by a battery and a super capacitor, comprising:
   a power source module including an electric power transformer, a battery, and a super capacitor, with the electric power transformer including a first positive terminal, a first negative terminal, a second positive terminal, a second negative terminal, a first control terminal, and a second control terminal, with the battery electrically connected between the first positive terminal and the first negative terminal, with the battery connected in parallel to a load, and with the super capacitor electrically connected between the second positive terminal and the second negative terminal; and
   a processing unit including two transformation control terminals, a switch control terminal, and a plurality of signal detection terminals, with the two transformation control terminals electrically connected to the first control terminal and the second control terminal of the electric power transformer, with the plurality of signal detection terminals adapted for detecting electrical characteristics of the power source module and the load, with the processing unit controlling the battery to charge the super capacitor based on the electrical characteristics, such that both the battery and the super capacitor supply electricity to the load, and such that electricity generated by the load can recharge the super capacitor.

2. The electric power supply system cooperated by a battery and a super capacitor as claimed in claim 1, wherein only the battery supplies electricity to the load when the electricity demanded by the load is smaller than an amount of electricity supplied by the battery.

3. The electric power supply system cooperated by a battery and a super capacitor as claimed in claim 1, wherein when the battery charges the super capacitor, the processing unit detects a voltage of the battery and uses the voltage of the battery to calculate an amount of electricity of the battery, and the super capacitor is charged according to the amount of electricity of the battery.

4. The electric power supply system cooperated by a battery and a super capacitor as claimed in claim 1, wherein when the electricity demanded by the load is larger than the amount of electricity supplied by the battery and the super capacitor, the battery and the super capacitor stop supplying electricity.

5. The electric power supply system cooperated by a battery and a super capacitor as claimed in claim 1, wherein when the electricity generated by the load recharges the super capacitor, the processing unit estimates an amount of charged electricity of the super capacitor 13 by using the following equation:

$$\Delta Q = \Delta C \times \Delta V$$

wherein $\Delta Q$ is a remaining power difference of the super capacitor, $\Delta C$ is a capacitance difference of the super capacitor, and $\Delta V$ is a voltage difference of the super capacitor.

6. The electric power supply system cooperated by a battery and a super capacitor as claimed in claim 1, with the electric power transformer including a transformer and first and second transistors, with the transformer including a primary side and a secondary side, with the primary side and the first transistor connected in series between the first positive terminal and the first negative terminal, with the secondary side and the second transistor connected in series between the second positive terminal and the second negative terminal, with each of the first and second transistors including a control terminal, and with the control terminals of the first and second transistors respectively connected to the first control terminal and the second control terminal.

7. The electric power supply system cooperated by a battery and a super capacitor as claimed in claim 1, wherein the battery is connected in series between the first positive terminal and the first negative terminal by an accumulator and a changeover switch.

* * * * *